United States Patent
Haner et al.

(10) Patent No.: US 7,437,161 B2
(45) Date of Patent: Oct. 14, 2008

(54) METHOD OF FAST DATA TRANSMISSION OF MOBILE STATIONS VIA THE SAME BASE STATION

(75) Inventors: Mark Haner, Westfield, NJ (US);
Danielle Hinton, Cambridge, MA (US);
Thierry Etienne Klein, Fanwood, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 456 days.

(21) Appl. No.: 11/080,852

(22) Filed: Mar. 16, 2005

(65) Prior Publication Data

US 2006/0209742 A1 Sep. 21, 2006

(51) Int. Cl.
*H04L 12/56* (2006.01)
*H04K 1/00* (2006.01)
*G01S 5/02* (2006.01)

(52) U.S. Cl. .................. 455/442; 455/509; 455/517; 380/247; 342/357.1; 370/277; 370/278; 370/312; 370/328; 370/350; 375/141; 375/267; 715/751

(58) Field of Classification Search .............. 370/328, 370/277, 278, 312, 350; 380/247; 342/357.1; 455/357.1, 442, 509
See application file for complete search history.

(56) References Cited

U.S. PATENT DOCUMENTS

| 5,528,247 | A | * | 6/1996 | Nonami | 342/357.1 |
|---|---|---|---|---|---|
| 5,809,141 | A | * | 9/1998 | Dent et al. | 380/247 |
| 6,532,369 | B1 | * | 3/2003 | Myer | 455/517 |
| 2006/0034277 | A1 | * | 2/2006 | Jang et al. | 370/389 |
| 2006/0209742 | A1 | * | 9/2006 | Haner et al. | 370/328 |
| 2007/0223404 | A1 | * | 9/2007 | Khan et al. | 370/278 |
| 2007/0242770 | A1 | * | 10/2007 | Kim et al. | 375/267 |
| 2007/0255994 | A1 | * | 11/2007 | Michel et al. | 714/751 |
| 2007/0298825 | A1 | * | 12/2007 | Kayama et al. | 455/522 |
| 2008/0008112 | A1 | * | 1/2008 | Lee | 370/312 |
| 2008/0043715 | A1 | * | 2/2008 | Ijiri | 370/350 |
| 2008/0057963 | A1 | * | 3/2008 | Kayama et al. | 455/442 |
| 2008/0057994 | A1 | * | 3/2008 | Duan et al. | 455/522 |
| 2008/0063031 | A1 | * | 3/2008 | Kanter | 375/141 |
| 2008/0081651 | A1 | * | 4/2008 | Kuroda et al. | 455/509 |
| 2008/0123567 | A1 | * | 5/2008 | Suzuki | 370/277 |

OTHER PUBLICATIONS

Wikipedia, "Base Station" printed Nov. 27, 2007.*
Kumaran, Krishnan et al., "*Uplink Scheduling in CDMA Packet-Data Systems*", IEEE, pp. 292-300, 2003.
Borst, Sem, "*User-Level Performance of Channel-Aware Scheduling Algorithms in Wireless Data Networks*", IEEE, pp. 321-331, 2003.
Joshi, Niranjan et al., "*Downlink Scheduling in CDMA Data Networks*", MOBICOM, Boston, MA USA, pp. 179-190, 2000.

* cited by examiner

*Primary Examiner*—William D Cumming

(57) ABSTRACT

In the method of packet transmission, data packet fragments received from a first mobile station are sent to a second mobile station without assembling and re-fragmenting the received data packet fragments if the first and second mobile stations are in a same cell.

19 Claims, 8 Drawing Sheets

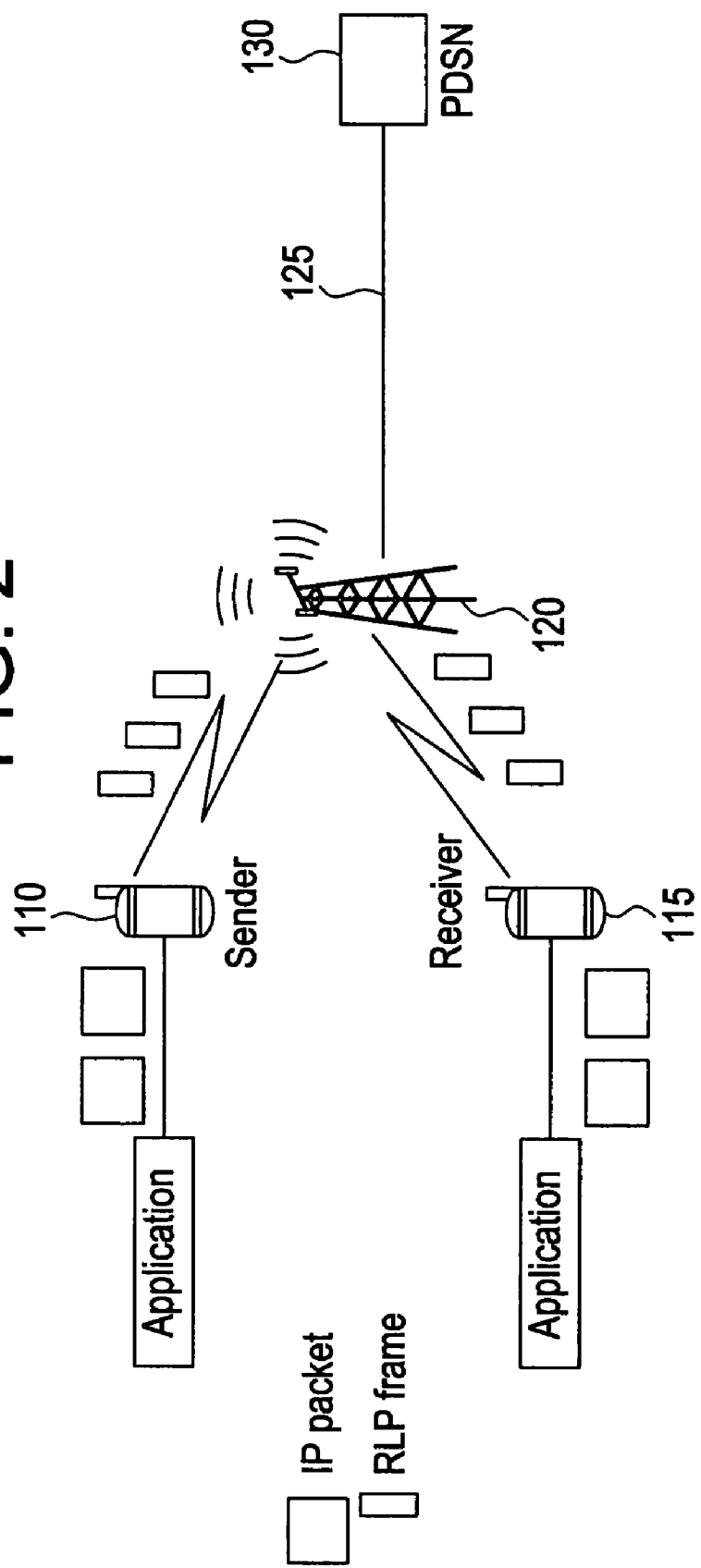

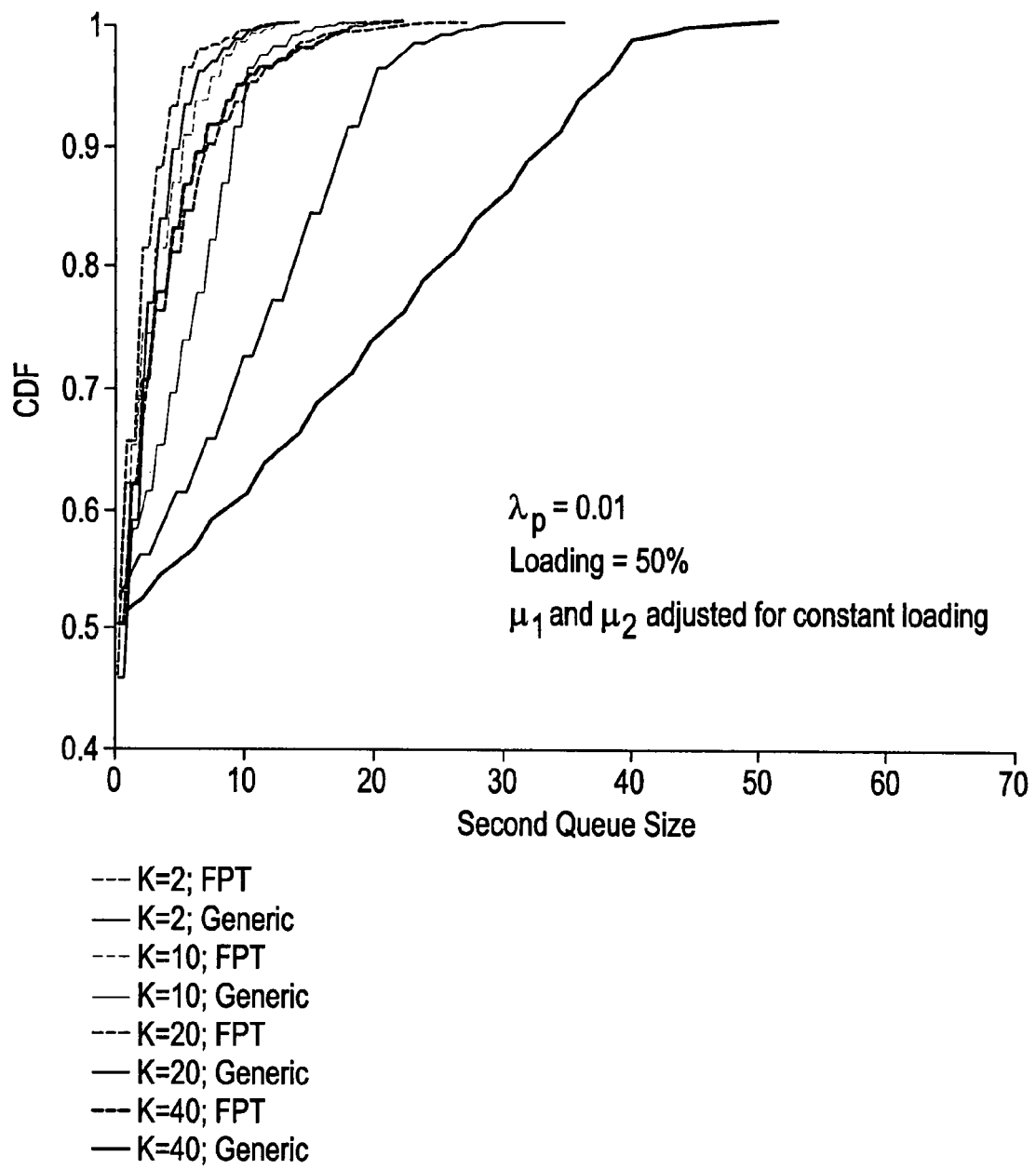

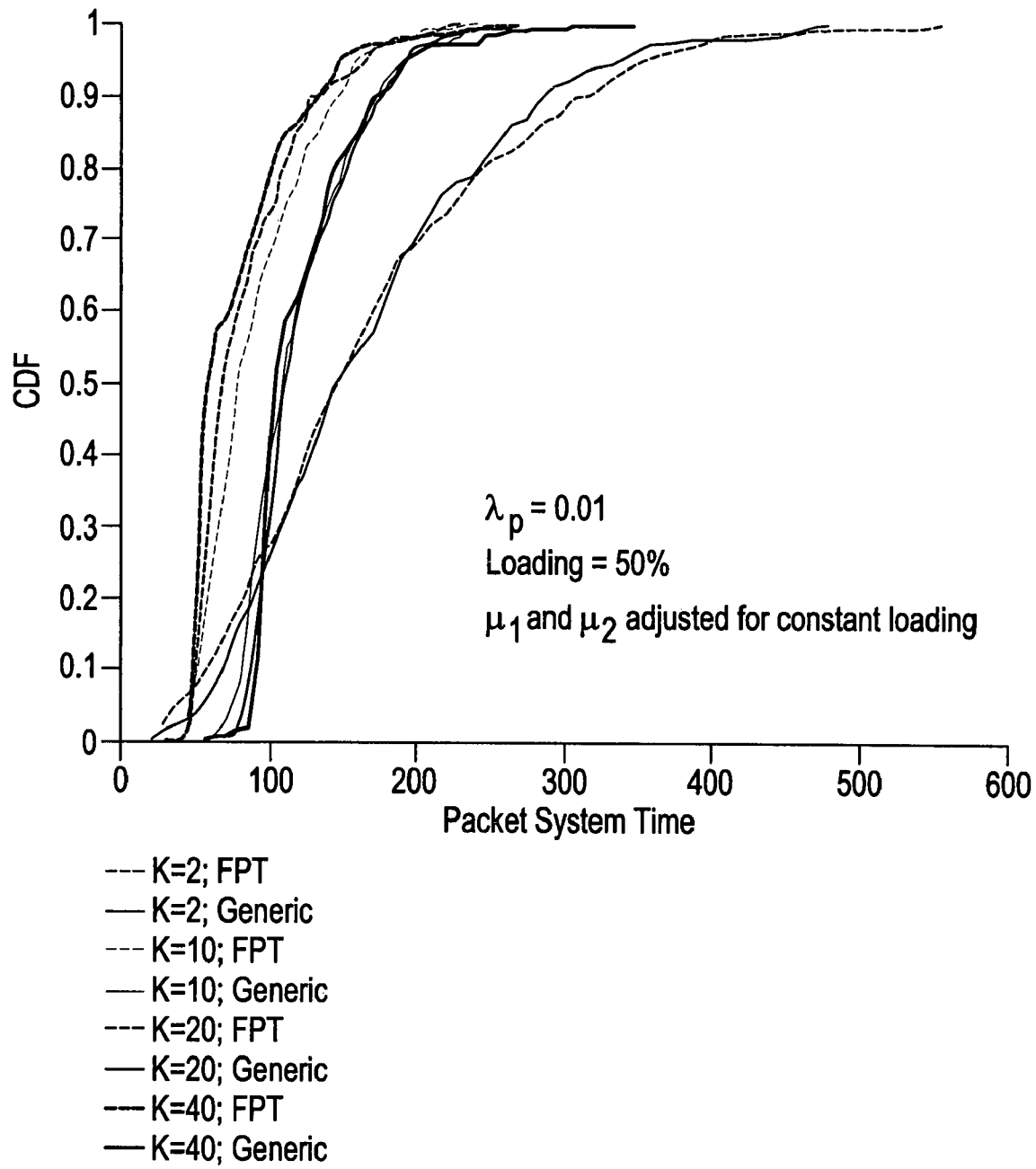

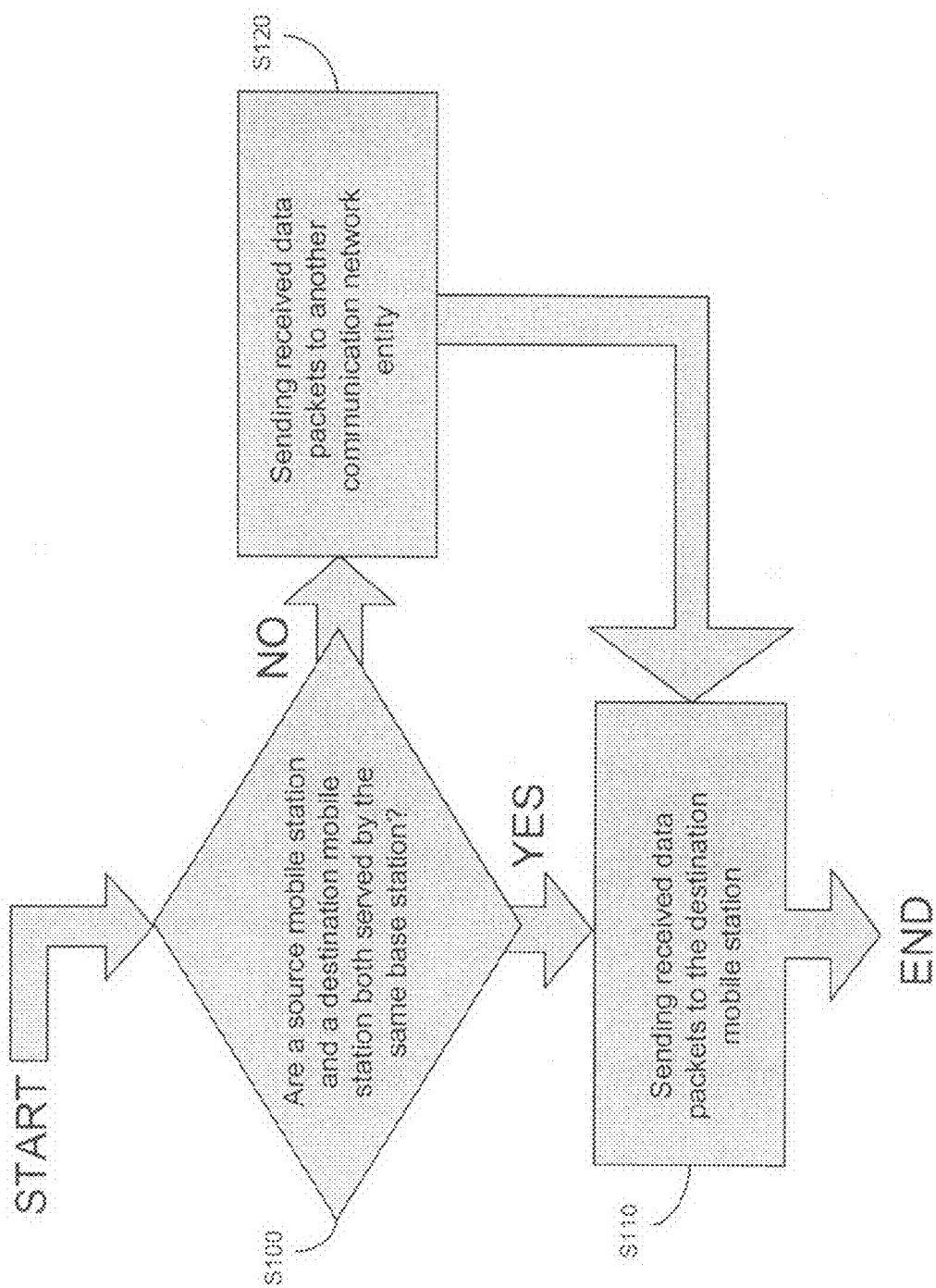

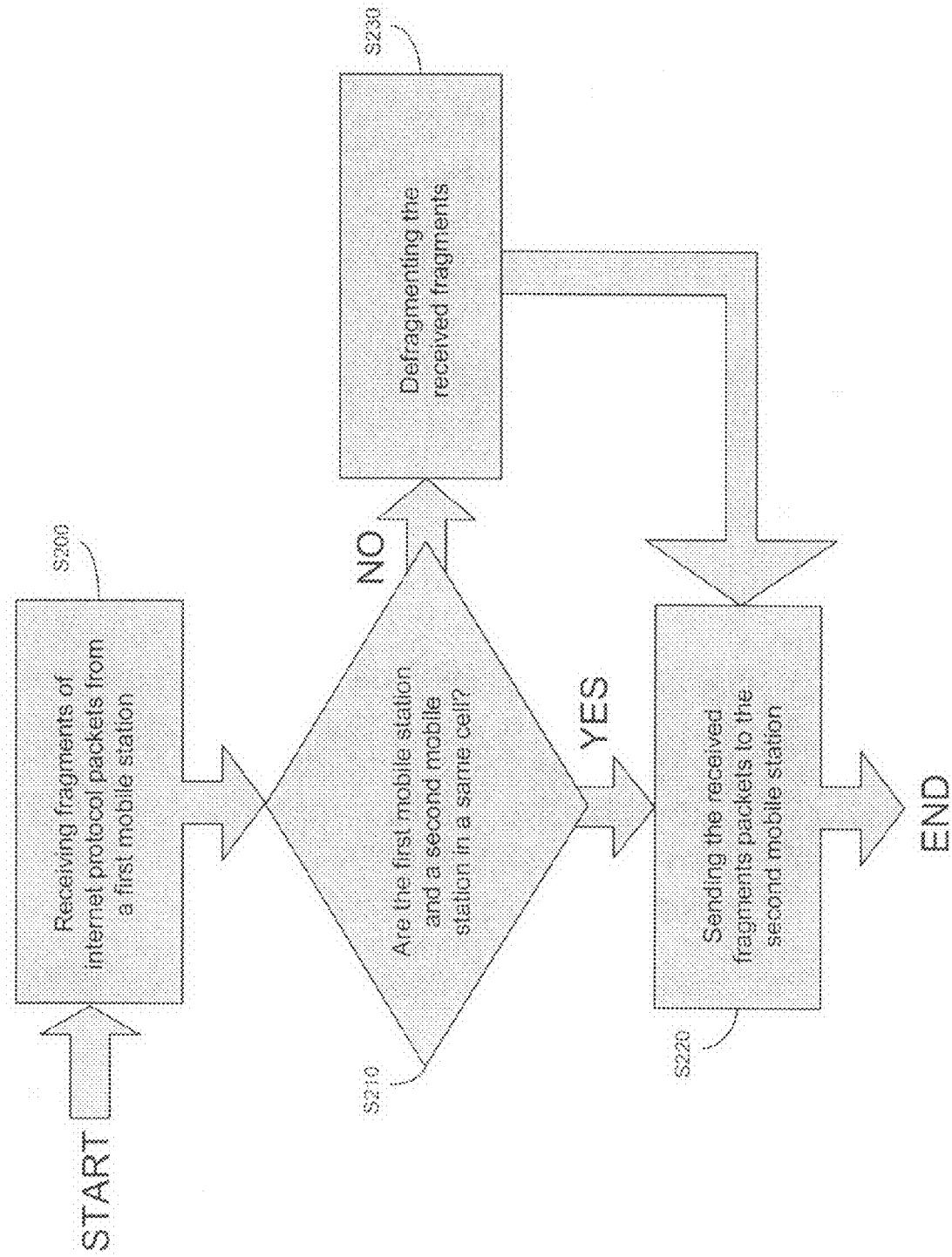

METHOD OF FAST DATA TRANSMISSION OF MOBILE STATIONS VIA THE SAME BASE STATION

BACKGROUND OF THE INVENTION

1. Field of the Invention

The present invention relates to wireless communication.

2. Description of Related Art

The achieved end-to-end performance of data applications is greatly influenced by the underlying transport control protocol. FIG. 1 illustrates a prior art network architecture for communicating internet protocol (IP) data packets from one wireless unit to another wireless unit where both the wireless units are located in the same cell and served by the same base station. As shown, a sending wireless unit 10 fragments each IP data packet into, generally, smaller radio link protocol (RLP) data frames. The sending wireless unit 10 transmits the RLP data frames.

A base station 20 receives the RLP data frames, and sends the RLP data frames to a packet data serving node (PDSN) 30 over radio access and backhaul networks 25. The PDSN 30 assembles the RLP data frames into IP data packets. As is known, the IP data packet includes an IP data packet header, and the IP data packet header includes the destination address of the IP data packet. Having assembled the IP data packet, the PDSN 30 may determine the destination of the IP data packet from the destination address in the IP data packet header. The PDSN 30 then refragments the IP data packet into RLP data frames. Based on the destination address of the IP data packet, the PDSN 30 sends the re-fragmented RLP data frames to the base station serving the, for example, wireless unit identified by the destination address. In this example, the destination wireless unit is the receiving wireless unit 15 served by the base station 20, which is also serving the sending wireless unit 10. As a result, the re-fragmented RLP data frames are sent back to the base station 20 from which they originally came. Besides sending the RLP data frames over the backhaul network 25 to the base station 20, the PDSN 30 also sends an indication of the destination of the RLP data frames.

Accordingly, based on the destination information received from the PDSN 30 for the RLP data frames received from the PDSN 30, the base station 20 transmits the RLP data frames to the receiving wireless unit 15. The receiving wireless unit 15 then reassembles the RLP data frames into IP data packets, and processes them.

This fragmentation of IP data packets and the aggregation of lower layer frames into IP data packets adds significantly and unnecessarily to the end-to-end delay along with the transmission delay and the processing delay at the different network entities. Retransmissions due to buffer overflow and lost packets further inflate the round trip time of IP data packets between the sending and the receiving wireless units.

SUMMARY OF THE INVENTION

In one embodiment of the present invention, fragments of data packets received from a first mobile station are sent to a second mobile station without assembling and re-fragmenting the received fragments if the first and second mobile stations are in a same cell.

For example, in one embodiment, data packet fragments are directly sent from a reception queue of a base station associated with a first mobile station to a transmission queue of the base station associated with a second mobile station if the first and second mobile stations are both served by the base station.

In another embodiment, it is determined, at a base station, whether a source mobile station, which is a source of received data units, and a destination mobile station, which is at least one destination of the received data units, are both served by the base station. The received data units are sent to the destination mobile station without sending the received data units out of the base station to another communication network entity if the determining step determines that the source and destination mobile stations are served by the base station.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein:

FIG. 2 illustrates a network architecture communicating internet protocol (IP) data packets from one wireless unit to another wireless unit where both the wireless units are located in the same cell and served by the same base station according to an embodiment of the method for data communication according to the present invention;

FIGS. 4 and 5 show the cumulative distribution functions (cdf) of the queue sizes (in terms of the number of fragments in queue over time) for the first queue and the second queue, respectively, in FIGS. 3A and 3B; and FIG. 6 shows the cdf for the packet system time in FIGS. 3A and 3B.

FIG. 7 shows an embodiment of the method for data communication in FIG. 2.

FIG. 8 shows another embodiment of the method for data communication in FIG. 2.

DETAILED DESCRIPTION OF EXAMPLE EMBODIMENTS

Figure 1:
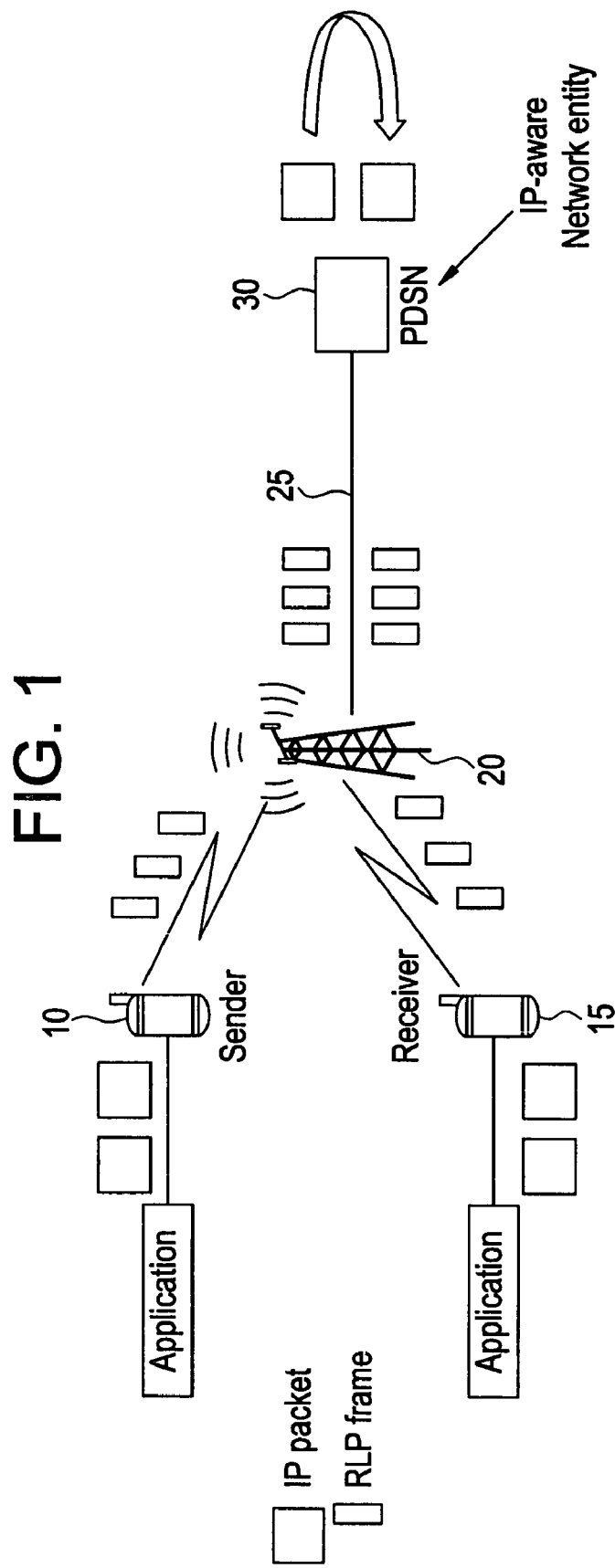
FIG. 1 illustrates a network architecture communicating internet protocol (IP) data packets from one wireless unit to another wireless unit where both the wireless units are located in the same cell and served by the same base station according to the methodology of the prior art.

FIG. 2 illustrates a network architecture communicating internet protocol (IP) data packets from one wireless unit to another wireless unit where both the wireless units are located in the same cell and served by the same base station according to an embodiment of the method for data communication according to the present invention. As shown, a sending wireless unit 110 generates IP data packets for transmission over a wireless interface. The sending wireless unit 110 may be a wireless phone, a wirelessly equipped PDA, a wirelessly equipped computer, etc. The sending wireless unit 110 fragments the IP data packets into, generally, smaller radio link protocol (RLP) data frames, and transmits the RLP data frames.

FIG. 8 illustrates an embodiment of the present invention. In FIG. 8, a base station 120 receives the RLP data frames in step S200. If it is determined in step S210 that the RLP data frames are destined for a receiving wireless unit, such as wireless unit 115 in the same cell as the sending wireless unit 110, then the flow advances to step S220 and base station 120 sends the RLP data frames onto the receiving wireless unit without flowing to step 230 and therefore without sending the RLP data frames over radio access and backhaul network 125 to a packet data serving node (PDSN) 130. Stated another way, and as illustrated in another embodiment of the present invention in FIG. 7, if in step S100 it is determined that the sending and receiving wireless units are both served by the base station 120, then the flow advances directly to step S110 without first flowing to step S120, and therefore the base station 120 directly sends the RLP data frames onto the receiving wireless unit.

Embodiments of determining whether the sending wireless unit 110 and the receiving wireless unit 115 are both handled by the base station 120 will now be described. In one embodiment, as illustrated in FIG. 8, the initially received RLP data frames in step S200 may be assembled into an IP data packet at the base station 120. This embodiment assumes an IP capable base station. From the IP data packet header, the base station 120 extracts the destination address and determines in step S210, if the destination address identifies a wireless unit being handled by the base station 120. If so, the methodology of the present invention is invoked. Subsequently received RLP data frames do not need to then be assembled and fragmented in this manner at the base station 120, as in step S230, and may be directly sent to the receiving wireless unit 115, as in step S220.

Alternatively, the initial RLP data frames may be sent to the PDSN 130 for assembly into an IP data packet and re-fragmentation into RLP data frames as in the prior art. Along with returning the RLP fragments to the base station 120, the PDSN 130 notifies the base station 120 that the RLP data frames being sent to the base station 120 were also received from the base station 120. For example, the PDSN 130 returns the destination address of the assembled IP data packet. Subsequently, received RLP data frames do not need to then be assembled and fragmented in this manner at the PDSN 130, and may be directly sent by the base station 120 to the receiving wireless unit 115.

Furthermore, as illustrated in FIG. 7, according to an embodiment of the present invention, if in step S100, the sending and receiving wireless units are connected to the base station, the base station sets a one bit flag FPT(sender, receiver)=1. Otherwise, the flag FPT(sender, receiver)=0, and the base station operates according to the prior art method of FIG. 1 and step S120. As long as FPT(sender, receiver)=1, the flows advances directly to step S110 and the base station directly forwards the incoming (and correctly received) RLP data frames in a reception queue for the sending wireless unit 110 to a transmission queue for the receiving wireless unit 115 and transmits the RLP data frames to the receiving wireless unit 115.

If there is a handoff indication, or a handoff procedure for either the sending wireless unit 110 or the receiving wireless unit 115 is initiated, the methodology of the present invention may be disabled. For example, the flag FPT(sender, receiver) may be set to 0.

According to this methodology, the received RLP data frames do not have to undergo assembly and re-fragmentation, such as was performed at the PDSN in the prior art methodology. When the sending and the receiving terminals are in the same cell, the methodology reduces experienced end-to-end latency by considering the base station as a relay of the lower layer packets without going through the radio access and backhaul networks and without unnecessary aggregation and fragmentation of higher layer packets. Even though the delay associated with the RLP-IP protocol conversion is eliminated, this methodology maintains the essential functionality of the RLP layer to provide for lower layer retransmissions and error recovery to combat the effect of channel fading.

Figure 3A:
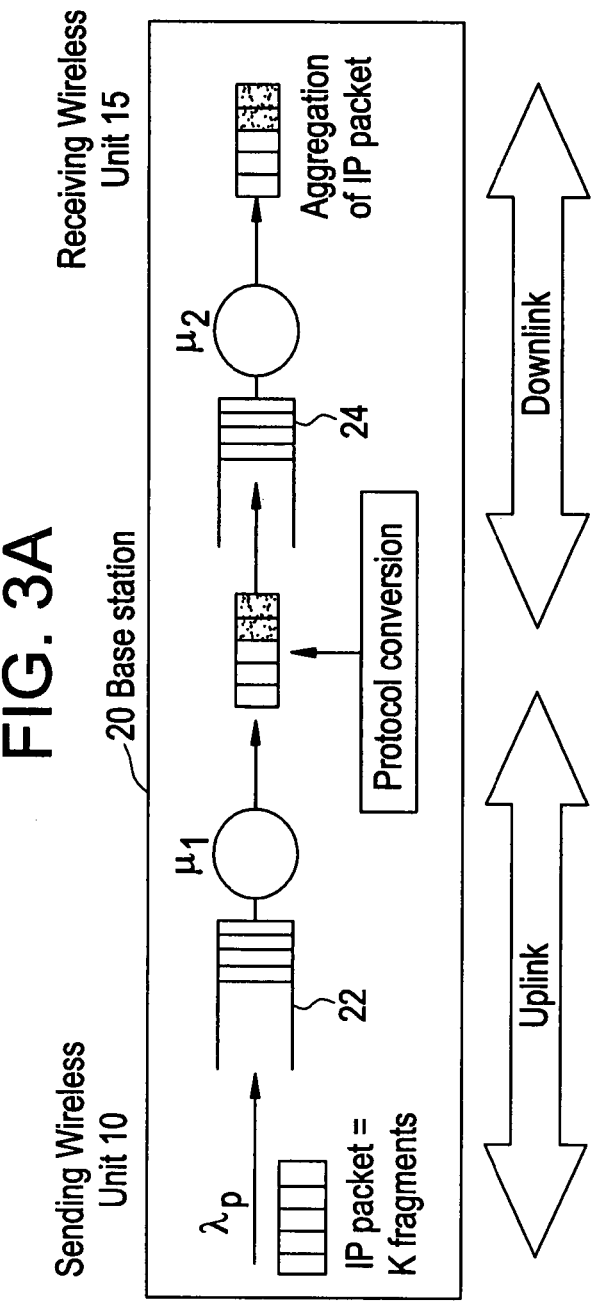
FIGS. 3A and 3B comparatively illustrate the merits of bypassing aggregation and fragmentation, where FIG. 3A models the methodology of prior art FIG. 1, and FIG. 3B models the methodology of the present invention described with respect to FIG. 2.
Figure 3B:
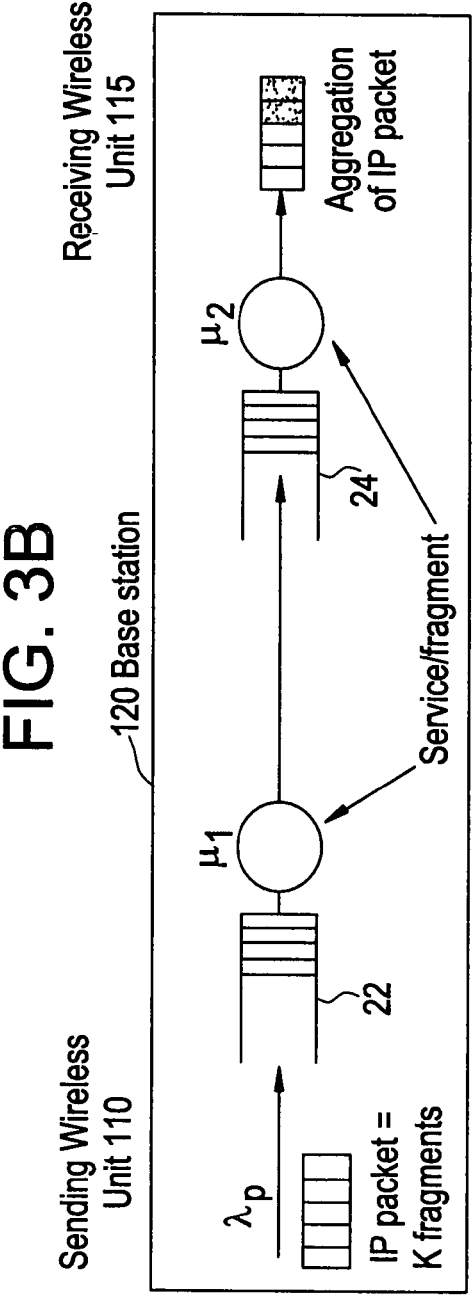

FIGS. 3A and 3B comparatively illustrate the merits of bypassing aggregation and fragmentation, where FIG. 3A models the methodology of prior art FIG. 1, and FIG. 3B models the methodology of the present invention described above with respect to FIG. 2. Consider a time-slotted system and assume that packets are generated independently from slot to slot with a given and fixed probability of arrival in each slot denoted by $\lambda_p$. Hence the packet inter-arrival times are geometrically distributed. An arriving packet contains a fixed number K of fragments, which are placed in a first queue 22. Here, the first queue 22 represents the uplink channel transmission for the sending wireless unit to the base station. The fragments are served on a first come first serve basis and independently from slot to slot. The variable $\mu_1$ denotes the probability that a fragment leaves the first queue 22 in a given slot, so that the fragment inter-departure times are again geometrically distributed. In the methodology of FIG. 1 represented by FIG. 3A, K fragments are assembled and re-fragmented pursuant to the protocol conversion that occurs at the PDSN. For simplicity, this protocol conversion is shown occurring at the base station 20 in FIG. 3A. The resulting fragments are then forwarded to a second queue 24 used to model the transmission on the downlink from the base station to the receiving wireless unit. In FIG. 3B, the aggregation and fragmentation of IP data packets (i.e., the protocol conversion of FIG. 3A) is bypassed; and fragments, upon departure from the first queue 22 are immediately placed into the second queue 24. In FIG. 3A, on the other hand, fragments arrive at the second queue 24 only when a full packet of K fragments has been assembled. The fragments in queue 24 are then again served on a first come first serve basis and $\mu_2$ denotes the probability that a fragment departs the second queue 24. IP data packets are then re-assembled from the K fragments output from the second queue 24 at the receiving wireless unit. In the models of FIGS. 3A and 3B, the processing and transmission times on the respective links in the network and in the base station have been ignored. The models concentrate on the delays associated with the over-the-air transmission and with the data packet fragmentation and aggregation.

Figure 4:
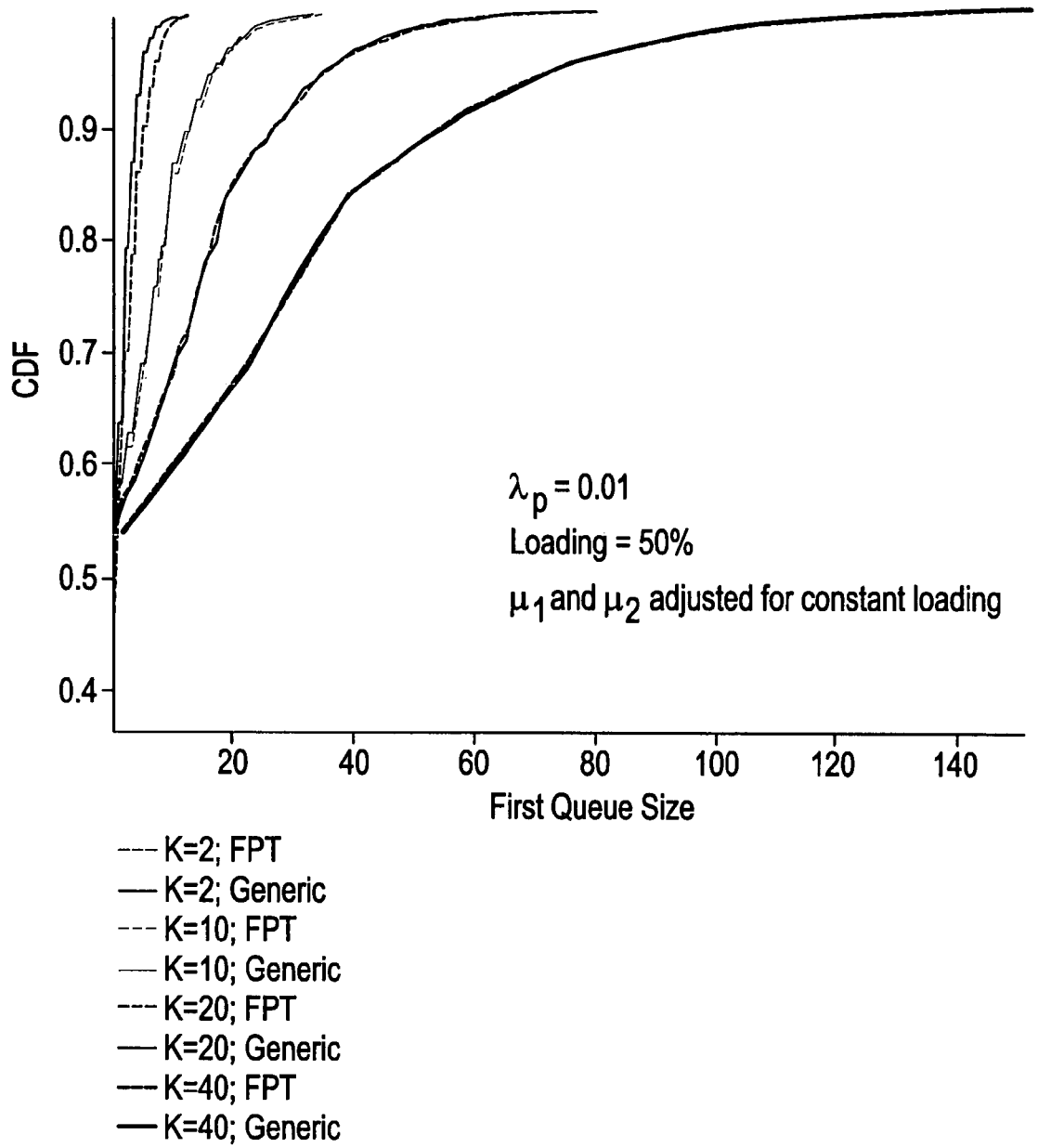

In FIGS. 4 and 5, the cumulative distribution functions (cdf) of the queue sizes (in terms of the number of fragments in a queue over time) for the first queue 22 and the second queue 24, respectively, are shown. In FIG. 6, the cdf for the packet system time is shown. In FIGS. 4, 5 and 6, the "generic" curves represent the queue sizes and packet system times for different numbers of K fragments using the methodology of FIG. 1 as modeled in FIG. 3A. Also, in FIGS. 4, 5 and 6, the "FPT" curves represent the queue sizes and packet system times for different numbers of K fragments using the methodology of FIG. 2 as modeled in FIG. 3B. Here, "FPT" stands for fast packet transmission.

The packet system time is calculated as the time duration between the arrival of a packet into the first queue at the sending wireless unit and the complete assembly of the same packet at the receiving wireless unit. In each figure, different graphs corresponding to different fragmentation levels are shown. The probability of packet arrival in a slot is held constant, but the number of fragments K in a packet is modified. For each value of K, the probabilities $\mu_1$ and $\mu_2$ of a packet departure from the first queue 22 and the second queue

24 are adjusted so that the loading ρ of the system remains constant at 50%. For simplicity it has also been assumed that $\mu_1=\mu_2$. In other words:

$$\mu_1 = \mu_2 = \frac{\lambda_p K}{\rho}$$

As expected, FIG. 4 shows that the size of the first queue 22 does not change between the prior art methodology of FIG. 1 and the fast packet transmission procedure of the present invention. This observation remains valid independently of the number of fragments in each packet. However, the queue size does change with K, as a larger value of K corresponds to more bursty traffic. For a given buffer overflow probability, the first queue 22 may be dimensioned appropriately for different values of K, but the target buffer size is independent of whether the fast packet transmission or the prior art transmission procedure is implemented.

However, FIG. 5 shows that the size of second queue 24 is generally larger with the prior art method compared to the method of the present invention. Note that for K=2, there is virtually no difference between the two queue sizes, as could be expected since the level of fragmentation is very small. However, the gap between the different queue sizes increases with increasing K. From this graph it is quite obvious that for a specified buffer overflow probability, the prior art methodology requires a larger buffer than the method of the present invention.

As stated above, FIG. 6 illustrates the cdf of the packet system time. The conclusions to be drawn from this figure mirror those drawn for the second queue size. For small values of K (low or no fragmentation), the system times for the prior art method and the method of the present invention are very close. On the other hand as K increases, the method of the present invention results in much smaller end-to-end packet delay. In summary, the method of the present invention improves both the end-to-end packet delay as well as the buffer requirements (or alternatively it decreases the packet loss probability due to buffer overflow).

Note that the embodiment of the present invention described above is easily modified to allow for broadcast or multicast traffic. If the traffic from a sending wireless unit is destined for several receiving wireless units $B_i$ connected to the same base station, the incoming RLP data frames may be copied and forwarded to the transmission queues of each receiving wireless unit $B_i$. Alternatively, a single copy of the RLP data frame may be forwarded to a "broadcast queue". The transmission of data from the broadcast queue is encoded with a code known to all receiving wireless unit $B_i$ in the broadcast set.

The exemplary embodiments of the present invention being thus described, it will be obvious that the same may be varied in many ways. For example, while the present invention has been described with respect to RLP data frames and IP data packets, it will be understood that the present invention is not limited in application to these data packet types. For example, instead of RLP frames, the IP data packets may be fragmented in point-to-point protocol (PPP) frames. Such variations are not to be regarded as a departure from the invention, and all such modifications as would be obvious to one skilled in the art are intended to be included within the present invention.

We claim:

1. A method of packet transmission, comprising:
   determining, at a base station, whether a source mobile station, which is a source of received data units, and a destination mobile station, which is at least one destination of the received data units, are both served by the base station; and
   sending the received data units to the destination mobile station without sending the received data units out of the base station to another communication network entity if the determining step determines that the source and destination mobile stations are served by the base station.

2. The method of claim 1, wherein the determining step determines whether the source and destination mobile stations are served by the base station based on a flag kept at the base station.

3. The method of claim 2, wherein the determining step sets the flag to indicate that the source and destination mobile stations are served by the base station based on a destination address in a header of a data packet represented by at least one of the received data units.

4. The method of claim 3, wherein during the determining step and the sending step, the received data units are radio link protocol data frames.

5. The method of claim 3, wherein during the determining step and the sending step, the received data units are fragments of an internet protocol packet.

6. The method of claim 2, wherein the determining step receives a destination address represented by at least one previously received data unit from the source mobile station, and sets the flag to indicate that the source and destination mobile stations are served by the base station based on the received destination address.

7. The method of claim 6, wherein the destination address is received from another network entity.

8. The method of claim 6, wherein during the determining step and the sending step, the received data units are radio link protocol data frames.

9. The method of claim 6, wherein during the determining step and the sending step, the received data units are fragments of an internet protocol packet.

10. The method of claim 1, wherein the determining step determines that the source and destination mobile stations are served by the base station based on a destination address in a header of a data packet represented by at least one of the received data units.

11. The method of claim 10, wherein during the determining step and the sending step, the received data units are radio link protocol data frames.

12. The method of claim 10, wherein during the determining step and the sending step, the received data units are fragments of an internet protocol packet.

13. The method of claim 1, wherein the determining step receives a destination address represented by at least one previously received data unit from the source mobile station, and determines that the source and destination mobile stations are served by the base station based on the received destination address.

14. The method of claim 13, wherein the destination address is received from another network entity.

15. The method of claim 13, wherein during the determining step and the sending step, the received data units are radio link protocol data frames.

16. The method of claim 13, wherein during the determining step and the sending step, the received data units are fragments of an internet protocol packet.

17. The method of claim 1, wherein the sending step sends the received data units to more than one destination mobile station without sending the received data units out of the base station to another communication network entity if the determining step determines that the source and the more than one destination mobile station are served by the base station.

18. A method of packet transmission, comprising:

sending data packet fragments received from a first mobile station to a second mobile station without assembling and re-fragmenting the received data packet fragments if the first and second mobile stations are in a same cell.

19. A method of packet transmission, comprising:

sending data packet fragments directly from a reception queue of a base station associated with a first mobile station to a transmission queue of the base station associated with a second mobile station if the first and second mobile stations are both served by the base station.

* * * * *